(12) United States Patent
Matsue et al.

(10) Patent No.: US 12,337,559 B2
(45) Date of Patent: Jun. 24, 2025

(54) POLARIZING FILM, METHOD FOR MOLDING POLARIZING FILM, AND METHOD FOR PRODUCING POLARIZING LENS

(71) Applicant: HOYA LENS THAILAND LTD., Pathumthani (TH)

(72) Inventors: Aoi Matsue, Tokyo (JP); Terufumi Hamamoto, Tokyo (JP); Teruo Yamashita, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 1078 days.

(21) Appl. No.: 17/059,825

(22) PCT Filed: May 30, 2019

(86) PCT No.: PCT/JP2019/021525
§ 371 (c)(1),
(2) Date: Nov. 30, 2020

(87) PCT Pub. No.: WO2019/230884
PCT Pub. Date: Dec. 5, 2019

(65) Prior Publication Data
US 2021/0213693 A1    Jul. 15, 2021

(30) Foreign Application Priority Data

| May 31, 2018 | (JP) | ............................. | 2018-104626 |
|---|---|---|---|
| May 31, 2018 | (JP) | ............................. | 2018-104627 |
| May 31, 2018 | (JP) | ............................. | 2018-104628 |

(51) Int. Cl.
*G02B 5/30* (2006.01)
*B29D 11/00* (2006.01)
*G02C 7/12* (2006.01)

(52) U.S. Cl.
CPC .. *B29D 11/00009* (2013.01); *B29D 11/00788* (2013.01); *G02B 5/30* (2013.01); *G02C 7/12* (2013.01)

(58) Field of Classification Search
CPC ...... G02B 5/30; G02B 1/08; B29D 11/00009; B29D 11/00788; G02C 7/12
(Continued)

(56) References Cited

U.S. PATENT DOCUMENTS

| 2,380,363 | A | * | 7/1945 | Land | ................... | G02B 5/3033 |
|---|---|---|---|---|---|---|
|  |  |  |  |  |  | 264/108 |
| 3,588,216 | A | * | 6/1971 | Bloom | ................. | C07C 321/00 |
|  |  |  |  |  |  | 252/585 |

(Continued)

FOREIGN PATENT DOCUMENTS

| JP | S62-263021 A | 11/1987 |
|---|---|---|
| JP | 2004-126414 A | 4/2004 |

(Continued)

OTHER PUBLICATIONS

Sep. 3, 2019 Search Report issued in International Patent Application No. PCT/JP2019/021525.

(Continued)

*Primary Examiner* — Ricky D Shafer
(74) *Attorney, Agent, or Firm* — Oliff PLC

(57) ABSTRACT

A polarizing film having a molded shape, in which a difference in average transmittance of the polarizing film at a wavelength of 400 to 700 nm is 5% or less before and after molding the shape of the polarizing film. In addition, when molding the polarizing film into a shape such as a curved surface, the polarizing film is heat-treated in a temperature range of Tg−20° C. or higher and Tg+10° C. or lower, where Tg is a glass transition point of a resin constituting the polarizing film. Further, one chamber is divided into a first (Continued)

space and a second space by the polarizing film disposed in the chamber, and the polarizing film is transfer-molded along a molding surface by a differential pressure generated by making a pressure in the first space and a pressure in the second space different from each other.

6 Claims, 10 Drawing Sheets

(58) Field of Classification Search
USPC .................................. 359/487.01, 487.02
See application file for complete search history.

(56) References Cited

U.S. PATENT DOCUMENTS

| | | | | |
|---|---|---|---|---|
| 3,720,555 | A * | 3/1973 | Ceppi | G02B 5/3033 |
| | | | | 156/196 |
| 4,923,758 | A * | 5/1990 | Marks | B29D 11/00865 |
| | | | | 264/1.32 |
| 5,232,637 | A * | 8/1993 | Dasher | B29C 39/10 |
| | | | | 264/1.32 |
| 5,434,707 | A * | 7/1995 | Dalzell | G02C 7/12 |
| | | | | 264/1.32 |
| 10,525,645 | B2 * | 1/2020 | Saito | B29D 11/00644 |
| 2004/0065967 | A1 | 4/2004 | Tanaka | |
| 2006/0028613 | A1 * | 2/2006 | Yasuda | G02B 5/3033 |
| | | | | 351/159.56 |
| 2007/0241313 | A1 * | 10/2007 | Kato | G06Q 40/02 |
| | | | | 252/585 |
| 2012/0262665 | A1 * | 10/2012 | Boinard | G02B 27/286 |
| | | | | 264/1.32 |
| 2014/0293217 | A1 | 10/2014 | Ogaya et al. | |
| 2015/0205011 | A1 * | 7/2015 | Gotou | G02C 7/12 |
| | | | | 351/49 |
| 2015/0248023 | A1 | 9/2015 | Kimura et al. | |
| 2016/0318266 | A1 | 11/2016 | Kim | |
| 2017/0009002 | A1 * | 1/2017 | Tsukada | C08G 18/3876 |
| 2021/0362446 | A1 * | 11/2021 | Takada | B29C 39/10 |
| 2021/0364684 | A1 * | 11/2021 | Takada | G02B 5/30 |
| 2021/0370625 | A1 * | 12/2021 | Takada | B29D 11/00442 |

FOREIGN PATENT DOCUMENTS

| | | |
|---|---|---|
| JP | 2014-142440 A | 8/2014 |
| JP | 2017-504070 A | 2/2017 |
| WO | 2014/021466 A1 | 2/2014 |
| WO | 2014/030603 A1 | 2/2014 |
| WO | WO-2017146201 A1 * | 8/2017 ......... B29C 35/0288 |

OTHER PUBLICATIONS

Sep. 3, 2019 Written Opinion issued in International Patent Application No. PCT/JP2019/021525.

* cited by examiner (a)

(b)

(c)

(d)

(a)

(b)

POLARIZING FILM, METHOD FOR MOLDING POLARIZING FILM, AND METHOD FOR PRODUCING POLARIZING LENS

TECHNICAL FIELD

The present invention relates to a polarizing film embedded inside a polarizing lens, a method for molding a polarizing film, and a method for producing a polarizing lens formed by sandwiching the polarizing film inside the lens.

BACKGROUND ART

In the related art, polarized plastic lenses for eyeglasses that block light in a predetermined polarization direction reflected by a water surface or the like have been known.

For example, Patent Literature 1 discloses a method for producing a polarizing lens having a polarizing film embedded inside the lens, in which a molding die having a cavity, in which a polarizing film is disposed, is assembled with an upper mold and a lower mold disposed facing each other so as to sandwich a polarizing film, which is subjected to a curved surface processing to have a predetermined lens surface shape, with a gap therebetween, and a sealing member which closes the gap between the upper mold and the lower mold, a curable composition is injected into the cavity, and then the curable composition is cured by heating or the like. Such a producing method is also generally referred to as a casting polymerization method or a casting method.

CITATION LIST

Patent Literature

Patent Literature 1: WO 2014/021466 A

SUMMARY OF INVENTION

Technical Problem

In the polarizing lens produced by the above producing method, polarizing performance and transmittance of the original polarizing film before the curved surface processing are deteriorated, and a polarizing lens having excellent polarizing performance may not be obtained. According to the studies by the present inventors, it has been found that this is because molecular orientation of the polarizing film is deteriorated by heating and humidification during curved surface processing.

According to the method for producing a polarizing lens in the related art as disclosed in Patent Literature 1, the curved surface processing of the polarizing film is first performed. Specifically, in order to reduce the deformation of the polarizing film after curved surface processing as much as possible, the film-shaped polarizing film before curved surface processing is wetted (humidified and heated) under high temperature and high humidity (for example, 70° C. or higher, 99% RH), and then preforms the curved surface processing using a press device so as to have a predetermined lens surface shape. As the polarizing film, usually, polyvinyl alcohol (PVA) is impregnated in iodine or a dye, which is then formed into a film shape and extended along one axis direction to use a film obtained therefrom. By uniaxial stretching, an amorphous portion of the film is stretched, and iodine and dye molecules in the film are oriented in a certain direction. The polarizing film exhibits polarizing performance when iodine and dye molecules are oriented in a certain direction in the film in this way.

However, when the polarizing film is moistened under high temperature and high humidity as described above, the film shrinks (deforms), the orientation of iodine and dye molecules in the film is disturbed, and the molecular orientation of the polarizing film deteriorates. When the molecular orientation deteriorates, the transmittance of the film also decreases, and even if a polarizing lens is produced using such a polarizing film, a polarizing lens having excellent transmittance and polarizing performance cannot be obtained.

Therefore, the present invention has been made in view of such conventional problems, and an object thereof is, firstly, to provide a polarizing film in which a shape is molded, and a decrease in transmittance is suppressed before and after molding, and secondly, to provide a method for producing a polarizing lens having excellent transmittance and polarizing performance by using such a polarizing film in which the decrease in the transmittance is suppressed after molding.

Further, the object is, thirdly, to provide a method for molding a polarizing film that can be stretch-molded into a curved surface or the like while maintaining the orientation of the polarizing film before molding, and can suppress the decrease in the transmittance after molding, and, fourthly, to provide a method for producing a polarizing lens having excellent transmittance and polarizing performance by using a polarizing film molded by such a method.

Further, the object is, fifthly, to provide a method for molding a polarizing film that has a simple work process and can reduce the foreign matter adhesion to the film surface after molding, and sixthly, to provide a method for producing a polarizing lens having excellent transmittance and polarizing performance by using a polarizing film molded by such a method.

Solution to Problem

In order to obtain a polarizing lens having excellent transmittance and polarizing performance, a polarizing film is required in which a shape is molded and a decrease in transmittance is suppressed before and after molding. For this, it is necessary to mold the polarizing film into a predetermined shape without deteriorating the orientation of the polarizing film before molding.

As a result of diligent studies to solve the above problems, the present inventors have found that when molding a shape of a polarizing film, the polarizing film is heat-treated in a predetermined temperature range including a glass transition point Tg of a resin constituting the polarizing film so that the shape of the polarizing film can be molded while maintaining the orientation of the polarizing film before molding. In addition, it has been found that in order to maintain the orientation of the polarizing film when molding the polarizing film, it is more preferable to use a polarizing film having a low water content for molding by leaving the polarizing film in an atmosphere where the humidity is not so high when molding the shape of the polarizing film.

The present invention has been completed based on the above finding. That is, in order to solve the above problems, the present invention has the following configuration.

(Configuration 1)

A polarizing film whose shape is molded by pressing the polarizing film against a molding surface, wherein a difference in average transmittance of the polarizing film at a wavelength of 400 to 700 nm is 5% or less before and after molding the shape of the polarizing film.

(Configuration 2) The polarizing film according to configuration 1, wherein a decrease rate of average transmittance of the polarizing film at a wavelength of 400 to 700 nm is 10% or less before and after molding the shape of the polarizing film.

(Configuration 3)

The polarizing film according to configuration 1 or 2, wherein the polarizing film is heat-treated in a temperature range of Tg−20° C. or higher and Tg+10° C. or lower, where Tg is a glass transition point of a resin constituting the polarizing film, before molding.

(Configuration 4)

The polarizing film according to any one of configurations 1 to 3, wherein the polarizing film is held in an atmosphere having a relative humidity of 20% or more and 70% or less before molding.

(Configuration 5)

The polarizing film according to any one of configurations 1 to 4, wherein the polarizing film is a polarizing film in which one chamber is divided into a first space and a second space where a molding die is disposed, by a polarizing film disposed in the chamber, and a shape is molded along a molding surface of the molding die by a differential pressure generated by making a pressure in the first space and a pressure in the second space different from each other.

(Configuration 6)

The polarizing film according to any one of configurations 1 to 5, wherein the polarizing film is a polyvinyl alcohol film impregnated with iodine and a dye.

(Configuration 7)

The polarizing film according to any one of configurations 1 to 6, wherein the polarizing film is used for producing a polarizing lens having a polarizing film embedded inside the lens.

(Configuration 8)

A method for producing a polarizing lens, including a step of molding a lens by sandwiching the polarizing film according to any one of configurations 1 to 7 inside the lens.

(Configuration 9)

A method for molding a polarizing film, the method including: molding the polarizing film into a shape such as a curved surface, wherein when a shape of the polarizing film is molded, the polarizing film is heat-treated in a temperature range of Tg−20° C. or higher and Tg+10° C. or lower, where, Tg is a glass transition point of a resin constituting the polarizing film.

(Configuration 10)

The method for molding a polarizing film according to configuration 9, wherein when the shape of the polarizing film is molded, the polarizing film is left in an atmosphere having a relative humidity of 20% or more and 70% or less.

(Configuration 11)

The method for molding a polarizing film according to configuration 10, wherein the polarizing film before molding is left in the atmosphere having a relative humidity of 20% or more and 70% or less, and then heat-treated.

(Configuration 12)

The method for molding a polarizing film according to any one of configurations 9 to 11, wherein one chamber is divided into a first space and a second space where a molding die is disposed, by the polarizing film disposed in the chamber, and the polarizing film is transfer-molded along a molding surface of the molding die by a differential pressure generated by making a pressure in the first space and a pressure in the second space different from each other.

(Configuration 13)

The method for molding a polarizing film according to any one of configurations 9 to 12, wherein a difference of average transmittance of the polarizing film at a wavelength of 400 to 700 nm is 5% or less before and after molding the shape of the polarizing film.

(Configuration 14)

The method for molding a polarizing film according to any one of configurations 9 to 13, wherein the polarizing film is used for producing a polarizing lens having a polarizing film embedded inside the lens.

(Configuration 15)

A method for producing a polarizing lens including: a step of molding a shape of a polarizing film by the method for molding a polarizing film according to any one of configurations 9 to 14; and a step of molding a lens by sandwiching the molded polarizing film inside the lens.

(Configuration 16)

A method for molding a polarizing film, the method including molding a shape of the polarizing film, wherein one chamber is divided into a first space and a second space where a molding die is disposed, by the polarizing film disposed in the chamber, and the polarizing film is transfer-molded along a molding surface of the molding die by a differential pressure generated by making a pressure in the first space and a pressure in the second space different from each other.

(Configuration 17)

The method for molding a polarizing film according to configuration 16, wherein first, both inside of the first space and inside of the second space are made into a vacuum state, and then the inside of the first space is returned to atmospheric pressure so as to transfer and mold the polarizing film along the molding surface of the molding die.

(Configuration 18)

The method for molding a polarizing film according to configuration 17, wherein after both the inside of the first space and the inside of the second space are made into a vacuum state, the molding surface of the molding die is pressed against the polarizing film surface, and then the inside of the first space is returned to atmospheric pressure.

(Configuration 19)

The method for molding a polarizing film according to any one of configurations 16 to 18, wherein when a shape of the polarizing film is molded, the polarizing film is heat-treated in a temperature range of Tg−20° C. or higher and Tg+10° C. or lower, where, Tg is a glass transition point of a resin constituting the polarizing film.

(Configuration 20)

The method for molding a polarizing film according to any one of configurations 16 to 19, wherein before the polarizing film is disposed in the chamber, the polarizing film is left in an atmosphere having a relative humidity of 20% or more and 70% or less.

(Configuration 21)

The method for molding a polarizing film according to configuration 19 or 20, wherein a difference of average transmittance of the polarizing film at a wavelength of 400 to 700 nm is 5% or less before and after molding the shape of the polarizing film.

(Configuration 22)

The method for molding a polarizing film according to any one of configurations 16 to 21, wherein the polarizing film is used for producing a polarizing lens having a polarizing film embedded inside the lens.

(Configuration 23)

A method for producing a polarizing lens including: a step of molding a shape of a polarizing film by the method for molding a polarizing film according to any one of configurations 16 to 22; and a step of molding a lens by sandwiching the molded polarizing film inside the lens.

Advantageous Effects of Invention

According to the present invention, it is possible to provide a polarizing film in which a shape such as a curved surface is molded, a decrease in transmittance is suppressed before and after molding, and polarizing performance after molding is excellent. Further, according to the method for producing a polarizing lens of the present invention, it is possible to obtain a polarizing lens having excellent transmittance and polarizing performance by using such a polarizing film in which the decrease in the transmittance is suppressed after molding.

Further, according to the method for molding a polarizing film of the present invention, it is possible to obtain a polarizing film that can be stretch-molded into a curved surface or the like while maintaining the orientation of the polarizing film before molding, can suppress the decrease in the transmittance after molding, and has excellent polarizing performance after molding. Further, it is possible to obtain a polarizing lens having excellent transmittance and polarizing performance by using such a polarizing film molded by the method of the present invention.

Further, according to the method for molding a polarizing film of the present invention, the transfer of the film is started from a top of the molding surface of the molding die, and the film is stretched and transferred toward the outer peripheral side of the molding surface, so that faithful molding is performed along the shape of the molding surface. In addition, since the work process is simple, and particularly, the surface of the polarizing film that is not in contact with the molding surface is molded in a non-contact state with any of the members, it is possible to suppress foreign matter adhesion during molding at least on the non-contact surface of the film. Further, it is possible to obtain a polarizing lens having excellent transmittance and polarizing performance by using such a polarizing film molded by the method of the present invention.

DESCRIPTION OF EMBODIMENTS

Hereinafter, embodiments for carrying out the present invention will be described in detail with reference to the drawings.

[Polarizing lens]

Figure 1:
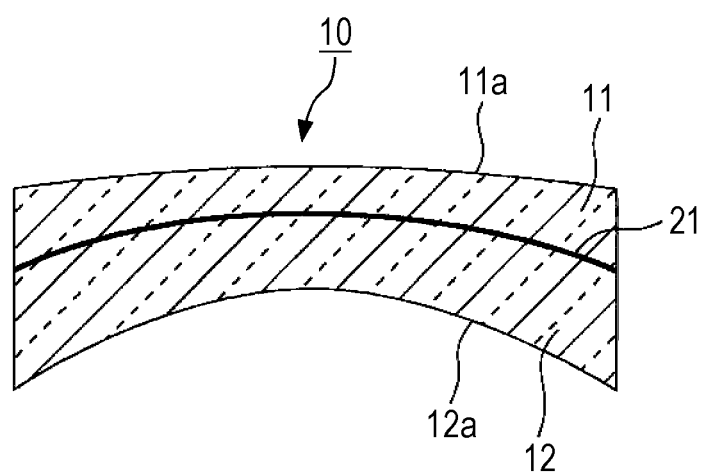
FIG. 1 is a cross-sectional view illustrating an embodiment of a polarizing lens according to the present invention.

FIG. 1 is a cross-sectional view illustrating an embodiment of a polarizing lens according to the present invention.

As illustrated in FIG. 1, a polarizing lens 10 of the present embodiment is a plastic lens having a meniscus shape, and is configured to include a first lens substrate 11, a second lens substrate 12, and a polarizing film 21 which is sandwiched between both lens substrates 11 and 12, and is subjected to curved surface processing. The first lens substrate 11 is provided on the object side (convex surface side) of the lens with respect to the polarizing film 21, and the second lens substrate 12 is provided on the eyeball side (concave surface side) of the lens. Further, both the first lens substrate 11 and the second lens substrate 12 have a meniscus shape, and in the first lens substrate 11, a convex surface side 11a corresponds to a convex surface portion of the lens, and the concave surface side is a surface that comes into contact with the polarizing film 21. Similarly, in the second lens substrate 12, a concave surface side 12a corresponds to a concave surface portion of the lens, and the convex surface side is the surface that comes into contact with the polarizing film 21.

The surface of the lens on the object side refers to a surface that becomes the object side visually recognized when the lens is worn as eyeglasses, among the surfaces constituting the lens. Further, the surface of the lens on the eyeglass side refers to a surface that becomes the eyeball side of the wearer when the lens is worn as eyeglasses, among the surfaces constituting the lens.

As the polarizing film 21 embedded inside the polarizing lens 10, for example, a polarizing film obtained by performing curved surface processing on a commercially available iodine-based polarizing film to a predetermined curvature using the molding method of the present invention, and then cutting the outer shape into a circular shape corresponding to the lens shape.

The polarizing lens 10 according to the present invention is useful as a spectacle lens.

The spectacle lens is usually roughly classified into a finished lens and a semi-finished lens. The finished lens means a lens in which both a refracting surface (usually a convex surface) on the lens object side and a refracting surface (usually a concave surface) on the eyeball side are mirror optical surfaces that satisfy the prescribed lens power, and a lens that does not require curved surface processing of the optical surface. The finished lens includes a lens that has been lens-shaped to match the spectacle frame and a lens that has not been lens-shaped.

On the other hand, a semi-finished lens usually has a meniscus shape in which one surface is a convex surface and the other surface is a concave surface, but it does not have a vision correction function, and only the convex surface of the lens has a mirror-processed optical surface, and the concave surface is an unprocessed surface. The lens thickness is designed to have a margin to be removed by processing so that the lens manufacturer can create a lens having a vision correction function by performing surface processing (such as grinding, cutting, and polishing) on the concave surface side, corresponding to the lens prescription power. In the present invention, the term spectacle lens includes both the finished lens and the semi-finished lens described above.

In the polarizing lens 10 of the type in which the polarizing film 21 is sandwiched between the two lens substrates 11 and 12, as illustrated in FIG. 1, the design of the refracting surface of the lens convex surface side 11a of the first lens substrate 11 is preferably a rotationally symmetric plane, and particularly preferably a spherical surface. This is because it facilitates mold production and curved surface formation of polarizing films.

Figure 2:
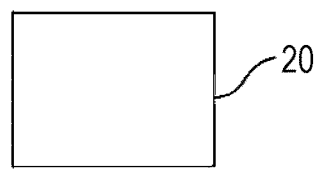
FIG. 2 is a diagram illustrating an outline of a producing process of the polarizing lens according to the present invention.
Figure 2:
Figure 2:
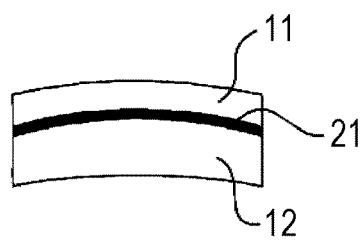
Figure 2:
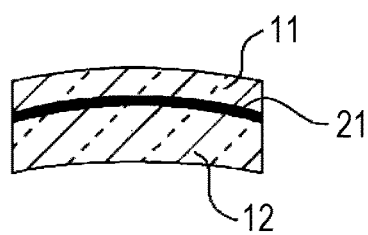

FIG. 2 is a diagram illustrating an outline of a producing process of the polarizing lens according to the present invention.

The producing process of the polarizing lens 10 as illustrated in FIG. 1 includes a step of molding a shape of a polarizing film and a step of molding a lens by sandwiching the molded polarizing film inside the lens.

First, in the step of molding the shape of the polarizing film, for example, a polarizing film 21 (refer to FIG. 2(b)) is molded by performing the curved surface processing on a commercially available iodine-based polarizing film 20 (refer to FIG. 2(a)) to a predetermined curvature. The present invention relates to a method for molding this polarizing film, and a polarizing film in which a shape such as a curved surface is molded. Details will be described later.

Further, in the step of molding a lens by sandwiching the molded polarizing film inside the lens (refer to FIGS. 2(c) and 2(d)), for example, a polarizing lens is produced by using a casting method (casting polymerization method). The casting method is a molding method to perform polymerization curing on a lens monomer within a cavity formed by an upper mold, a lower mold, and a sealing member to adjust a distance between the upper and lower molds, to determine a lens thickness, and to obtain a lens after mold release. Note that FIG. 2(c) illustrates a state in which the lens monomer is injected into the cavity and the two lens substrates 11 and 12 are uncured, and FIG. 2(d) illustrates that the polymerization curing is performed on the injected lens monomer by heating or the like and then a polarizing lens is obtained after mold release.

(Polarizing Film)

Next, the polarizing film according to the present invention will be described.

Figure 3:
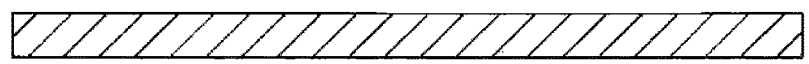
FIG. 3 is a cross-sectional view of a polarizing film used in the present invention.

FIG. 3 is a cross-sectional view of the polarizing film 20 used in the present invention. The polarizing film used in the present invention is not particularly limited as long as it exhibits a polarizing function, but is preferably a single-layer or multi-layer film including, for example, a resin layer made of polyvinyl alcohol (PVA). PVA is particularly preferable because it is excellent in transparency, heat resistance, affinity with iodine as a dyeing agent, or a dichroic dye, and orientation during stretching. Therefore, as the polarizing film, those obtained by impregnating PVA in iodine or a dye, then molded into a film shape, and extended along one axis direction are preferably used. By uniaxial stretching, an amorphous portion of the film is stretched, and iodine and dye molecules in the film are oriented in a certain direction. The polarizing film exhibits polarizing performance when iodine and dye molecules are oriented in a certain direction in the film in this way. In addition, triacetyl cellulose (TAC) or the like may be layered as a protective layer on one side or both sides of such a single-layer resin layer of PVA.

The thickness of the polarizing film 20 is not particularly limited as long as the curved surface processing can be performed on the film. For example, in the case of a normal commercially available polarizing film, it is preferably about 10 μm to 500 μm. This is because a thickness of 10 μm or more provides high rigidity and ease of handling while a thickness of 500 μm or less provides ease upon the curved surface processing of the film.

The polarizing film according to the present invention is a polarizing film whose shape such as a curved surface is molded by pressing the polarizing film against a molding surface, as in the invention of the above Configuration 1, in which a difference in average transmittance of the polarizing film at a wavelength of 400 to 700 nm is 5% or less before and after molding the shape of the polarizing film. According to the polarizing film according to the present invention, it is possible to provide a polarizing film in which a decrease in transmittance is suppressed before and after molding, and thus the polarizing performance after molding is excellent. Further, it is possible to obtain a polarizing lens having excellent transmittance and polarizing performance by using such a polarizing film in which the decrease in the transmittance is suppressed after molding.

In addition, in the present invention, it is more preferable that a difference in average transmittance of the polarizing film at a wavelength of 400 to 700 nm is 3% or less before and after molding the shape of the polarizing film.

Further, in the polarizing film according to the present invention, it is preferable that a decrease rate of average transmittance of the polarizing film at a wavelength of 400 to 700 nm is 10% or less before and after molding the shape of the polarizing film (the invention of the above Configuration 2).

[Method for molding polarizing film]

Next, a method for molding a polarizing film according to the present invention will be described.

The method for molding a polarizing film of the present invention is a method for molding the polarizing film into a shape such as a curved surface as described in the invention of the above Configuration 9, and the polarizing film is heat-treated in a temperature range of Tg−20° C. or higher and Tg+10° C. or lower when a shape of the polarizing film is molded. Here, Tg is the glass transition point of the resin constituting the polarizing film. When the above PVA film is used as the polarizing film, Tg is, for example, 50° C. Therefore, the temperature range of the heat treatment is specifically 30° C. or more and 60° C. or less.

As described above, in the method for producing a polarizing lens in the related art as disclosed in Patent Literature 1, when the curved surface processing is performed on the polarizing film, in order to reduce the deformation of the polarizing film after curved surface processing as much as possible, the film-shaped polarizing film before curved surface processing is wetted (humidified and heated) under high temperature and high humidity (for example, 70° C. or higher, 99% RH), and then the curved surface processing using a press device is performed so as to have a predetermined lens surface shape.

Further, as described above, in the polarizing film, an amorphous portion of the film is stretched by uniaxially stretching a film such as PVA as a substrate, and iodine and dye molecules in the film are oriented in a certain direction.

In the polarizing film, the polarizing performance is exhibited by the orientation of iodine and dye molecules in the film in a certain direction.

However, according to the studies by the present inventors, it has been found that the molecular orientation of the polarizing film is deteriorated by heating and humidification during the curved surface processing. That is, when the polarizing film is moistened under high temperature and high humidity when the curved surface processing is performed as described above, the film shrinks (deforms), the orientation of iodine and dye molecules in the film is disturbed, and the molecular orientation of the polarizing film deteriorates. When the molecular orientation deteriorates, the transmittance of the film also decreases, and even if a polarizing lens is produced using such a polarizing film, a polarizing lens having excellent transmittance and polarizing performance cannot be obtained.

As a result of diligent studies to solve such a problem in the related art, the present inventors have obtained the following findings.

That is, it has been found that when molding a shape of a polarizing film, the polarizing film is heat-treated in a predetermined temperature range including a glass transition point Tg of a resin constituting the polarizing film so that the shape of the polarizing film can be molded while maintaining the orientation of the polarizing film before molding.

That is, when the polarizing film is molded into a shape such as a curved surface, if the polarizing film before molding is heat-treated in a temperature range of Tg−20° C. or higher and Tg+10° C. or lower, without deteriorating the orientation of the polarizing film before molding, in short, it is possible to stretch and mold the polarizing film into a shape such as a predetermined curved surface while maintaining the orientation of the polarizing film before molding. Further, as a result of maintaining the orientation, it is possible to suppress a decrease in the transmittance of the film after molding. As a result, those having excellent transmittance and polarizing performance after molding can be obtained.

Further, it is possible to obtain a polarizing lens having excellent transmittance and polarizing performance by producing a polarizing lens using such a polarizing film molded by the method of the present invention.

If the above polarizing film is heat-treated at a temperature higher than Tg+10° C., the film is cold-crystallized, that is, the polymer is rearranged and the molecular orientation is disturbed, and as a result, the polarizing performance may deteriorate. Further, even if the polarizing film is heat-treated at a temperature of lower than Tg−20° C., it is difficult to mold it into a desired shape due to the temperature lower than the softening temperature of the film.

Further, in the present invention, it is more preferable to heat-treat the polarizing film before molding at a temperature range of 30° C. to 60° C.

In addition, in order to maintain the orientation of the polarizing film when molding the polarizing film, it is more preferable to use a polarizing film having a low water content for molding by leaving the polarizing film, for example, in an atmosphere where the humidity is not so high when molding the shape of the polarizing film.

Specifically, it is more preferable that when the shape of the polarizing film is molded, as a treatment before molding, the polarizing film is left in an atmosphere having a relative humidity of 20% or more and 70% or less. When the treatment in an atmosphere with a relative humidity higher than 70%, the water content of the polarizing film increases, which may cause deterioration of orientation due to shrinkage or deformation of the polarizing film, and transfer to the molding surface is not performed well. On the other hand, the lower limit of the relative humidity is not particularly limited, but it is preferably 20% or more, which is an atmosphere of normal humidity.

In the present invention, it is a more preferable embodiment that the polarizing film before molding is left in the atmosphere having a relative humidity of 20% or more and 70% or less, and the polarizing film is heat-treated in a temperature range of Tg−20° C. or higher and Tg+10° C. or lower.

Further, in the present invention, as in the invention of the above Configuration 16, it is preferable to apply a method for molding a shape of a polarizing film, wherein one chamber is divided into a first space and a second space where a molding die is disposed, by the polarizing film disposed in the chamber, and the polarizing film is transfer-molded along a molding surface of the molding die by a differential pressure generated by making a pressure in the first space and a pressure in the second space different from each other.

Figure 4:
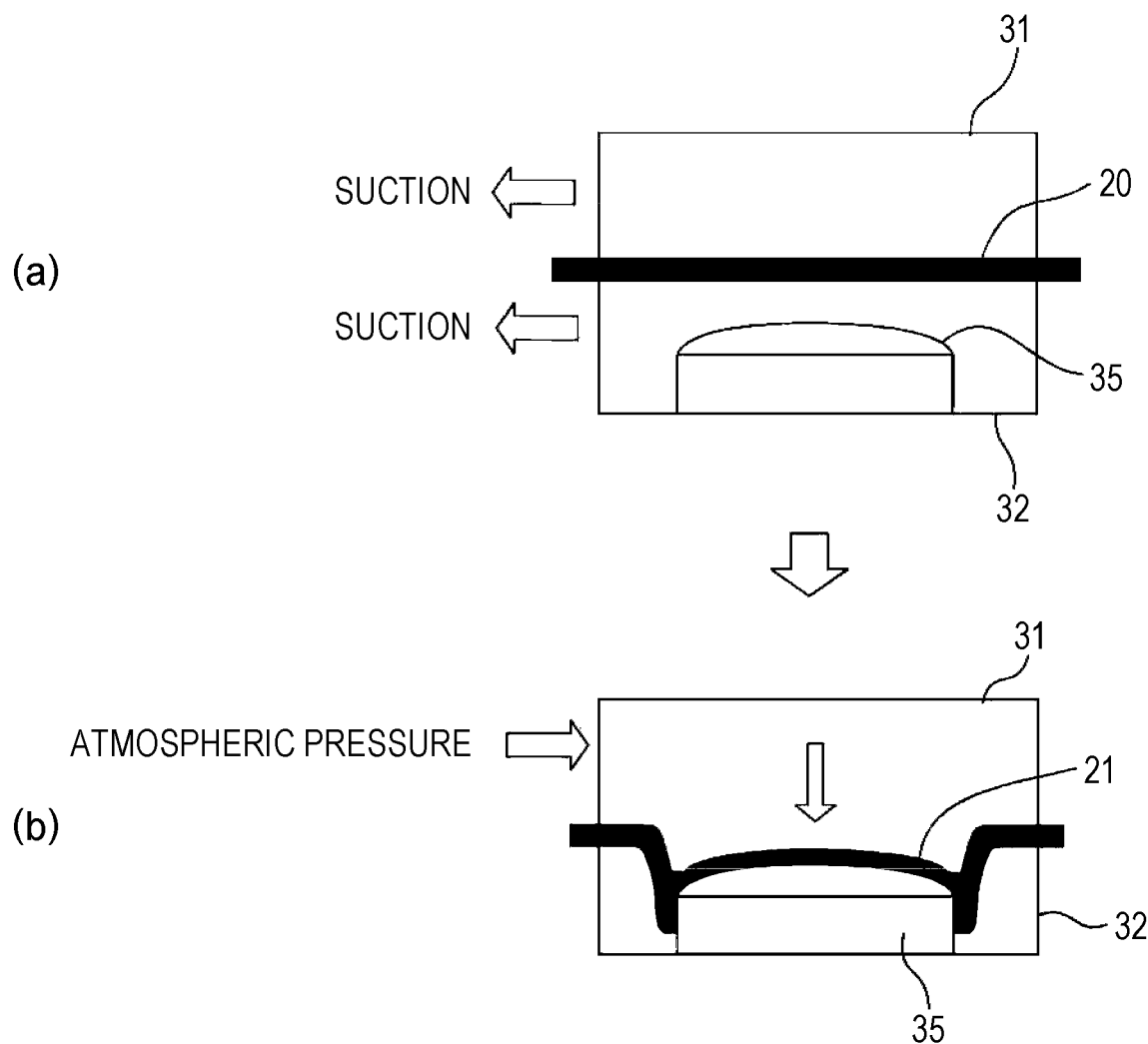
FIG. 4 is a schematic view for explaining an embodiment of a method for molding a polarizing film according to the present invention.

FIG. 4 is a schematic view for explaining an embodiment of a method for molding a polarizing film according to the present invention.

As illustrated in the drawing, an upper chamber box 31 and a lower chamber box 32 form one chamber. The inside of this chamber is divided into a first space (upper space shown in the drawing) and a second space (lower space shown in the drawing) in which a molding die 35 is disposed by the polarizing film 20 disposed in the chamber. The polarizing film 20 disposed in this chamber is heat-treated in a temperature range of Tg−20° C. or higher and Tg+10° C. or lower.

First, both the inside of the first space and the inside of the second space are sucked into a vacuum state (refer to FIG. 4(*a*)). Then, by returning the inside of the first space to atmospheric pressure (refer to FIG. 4(*b*)), the polarizing film 20 is transfer-molded along the molding surface of a molding die 35. That is, the polarizing film 20 is pressed against the molding surface of the molding die 35 and transfer-molded by a differential pressure generated by making a pressure in the first space and a pressure in the second space different from each other.

Figure 5:
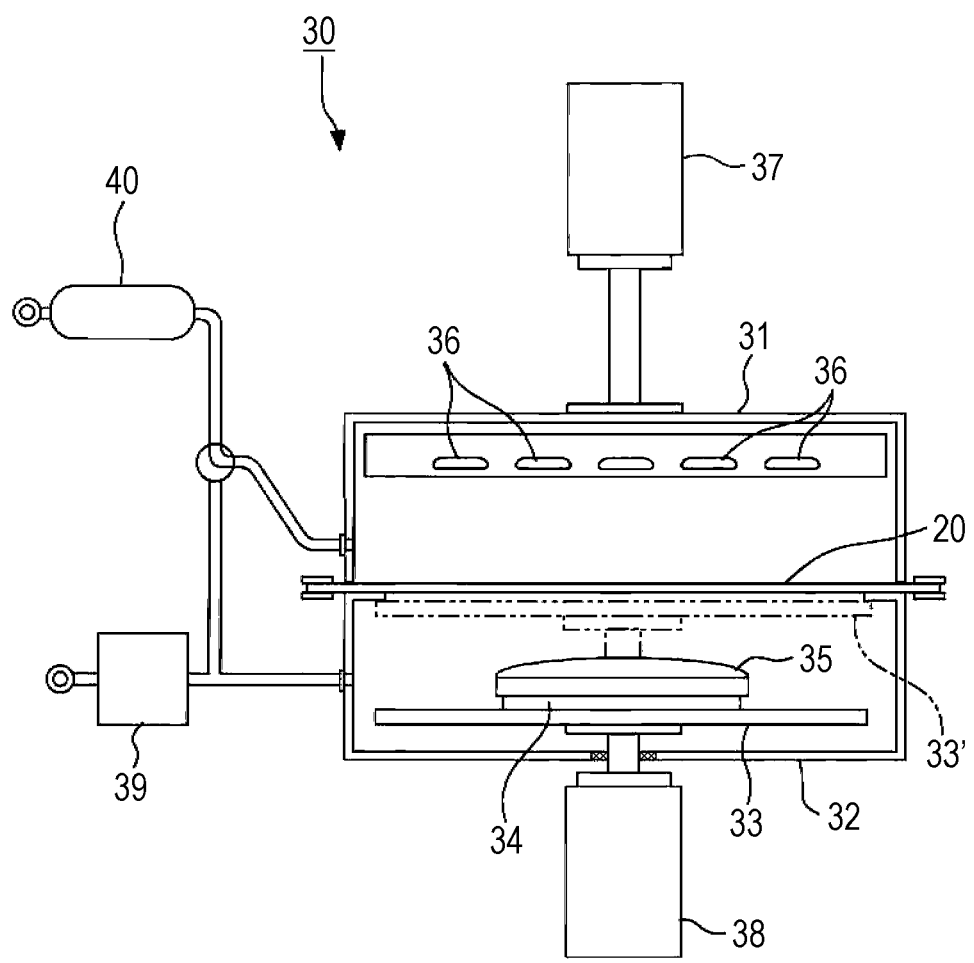
FIG. 5 is a schematic configuration diagram of a molding apparatus used in an embodiment of a method for molding a polarizing film according to the present invention.

FIG. 5 is a schematic configuration diagram of a molding apparatus used in an embodiment of the above described method for molding a polarizing film.

A little more detail will be given with reference to FIG. 5, including the details of the molding apparatus.

A molding apparatus 30 illustrated in FIG. 5 includes an upper chamber box 31 and a lower chamber box 32. The upper chamber box 31 and the lower chamber box 32 are overlapped to form one chamber. The inside of this chamber is divided into a first space (space inside the upper chamber box 31 shown in the drawing) and a second space (space inside lower the lower chamber box 32 shown in the drawing) by the polarizing film 20 disposed in the chamber. The upper chamber box 31 can be moved up and down by a driving device 37, and is configured to be able to overlap with or separate from the lower chamber box 32 (as illustrated in FIG. 5).

Further, a plurality of heaters 36 are arranged above the inside of the upper chamber box 31. Further, a molding die 35 is installed on a table 33 inside the lower chamber box 32 via a set base 34. The molding die 35 has a curved molding surface for imparting a predetermined shape (lens surface shape) to the polarizing film 20. The table 33 is raised and lowered inside the lower chamber box 32 by a driving device 38.

Further, the upper chamber box 31 is connected to a vacuum tank 39 and a compressed air tank 40 by switching, and the lower chamber box 32 is connected to the vacuum tank 39.

The polarizing film of the present invention can be molded by the molding apparatus described above.

First, in a state where the upper chamber box 31 is raised and separated from the lower chamber box 32, the polarizing film 20 is installed so as to cover the entire upper surface opening of the lower chamber box 32.

Next, the upper chamber box 31 is lowered and overlapped with the lower chamber box 31 (as illustrated in FIG. 5). The inside of one chamber formed by overlapping the upper chamber box 31 and the lower chamber box 32 is divided into a first space (space inside the upper chamber box 31) and a second space (space inside lower the lower chamber box 32) by the polarizing film 20 disposed in the chamber.

Next, the vacuum tank 39 is operated to suck the inside of the chamber, and the first space (the space inside the upper chamber box 31) and the second space (the space inside the lower chamber box 32) are simultaneously made into a vacuum state. Subsequently, the heat treatment is performed on the polarizing film 20 by the heater 36. In the present invention, the polarizing film 20 is preferably heat-treated in a temperature range of Tg−20° C. or higher and Tg+10° C. or lower. Heating means for performing such a heat treatment is not limited to a heater, and an infrared lamp or the like that emits heat may be used. Further, the present invention is not limited to the embodiment in which the polarizing film is heat-treated in such a molding apparatus. For example, the polarizing film before being installed in the molding apparatus is heat-treated, and then the heat-treated polarizing film may installed in the molding apparatus.

Next, the table 33 in the lower chamber box 32 is raised to bring the molding surface of the molding die 35 into contact with the polarizing film 20 from below. A position 33' where the table 33 in FIG. 5 is shown by a broken line indicates an ascending position. The polarizing film 20 may be lowered so that the polarizing film 20 is brought into contact with the molding surface of the molding die 35.

Next, the inside of the first space (the space inside the upper chamber box 31) is returned to atmospheric pressure. If necessary, compressed air may be sent from the compressed air tank 40. As a result, as illustrated in FIG. 4(b) described above, the polarizing film 20 is transfer-molded along the molding surface of the molding die 35. In this case, the transfer of the film is started from a top of the molding surface of the molding die 35, and the film is stretched and transferred toward the outer peripheral side of the molding surface, so that faithful molding is performed along the shape of the molding surface.

Finally, after returning the inside of the second space (the space inside the lower chamber box 32) to atmospheric pressure, the upper chamber box 31 is raised to open the chamber, and the molded polarizing film 21 is taken out from the inside.

In the above, a case where first, both inside of the first space and inside of the second space are made into a vacuum state, and then the inside of the first space is returned to atmospheric pressure is described. In short, the polarizing film 20 is pressed against the molding surface of the molding die 35 and transfer-molded by a differential pressure generated by making a pressure in the first space and a pressure in the second space different from each other.

Further, when the polarizing film is molded by the method for molding the polarizing film according to the invention of the above Configuration 16 using, for example, the molding apparatus illustrated in FIG. 5 as described above, the surface of the polarizing film that is not in contact with the molding surface is molded in a non-contact state with any of the members, it is possible to suppress foreign matter adhesion during molding at least on the non-contact surface of the film. That is, according to this method for molding a polarizing film, the work process is simple and foreign matter adhesion on the film surface after molding can be reduced, so that a work load such as cleaning can be reduced and the efficiency of the entire work process can be improved.

According to the method for molding a polarizing film of the present invention, it is possible to obtain a polarizing film that can be molded into a predetermined curved surface or the like while maintaining the orientation of the polarizing film before molding, and thus can suppress the decrease in the transmittance after molding. As a result, a molded polarizing film having excellent transmittance and polarizing performance after molding can be obtained.

According to the present invention, a difference in average transmittance of the polarizing film at a wavelength of 400 to 700 nm is 5% or less before and after molding the shape of the polarizing film.

As described above, when the polarizing film is molded into a shape such as a curved surface, if the polarizing film before molding is heat-treated in a temperature range of Tg−20° C. or higher and Tg+10° C. or lower, and more preferably, as a treatment before molding, if the polarizing film is left in an atmosphere having a relative humidity of 20% or more and 70% or less, and a polarizing film having a low water content is used, without deteriorating the orientation of the polarizing film before molding, that is, it is possible to transfer-mold the polarizing film into a shape such as a predetermined curved surface while maintaining the orientation of the polarizing film before molding. Further, as a result of maintaining the orientation, it is possible to suppress a decrease in the transmittance of the film after molding, and a film having excellent transmittance and polarizing performance after molding can be obtained.

The present invention can also be suitably applied to the case where the film is molded by a press molding method in the related art.

Figure 6:
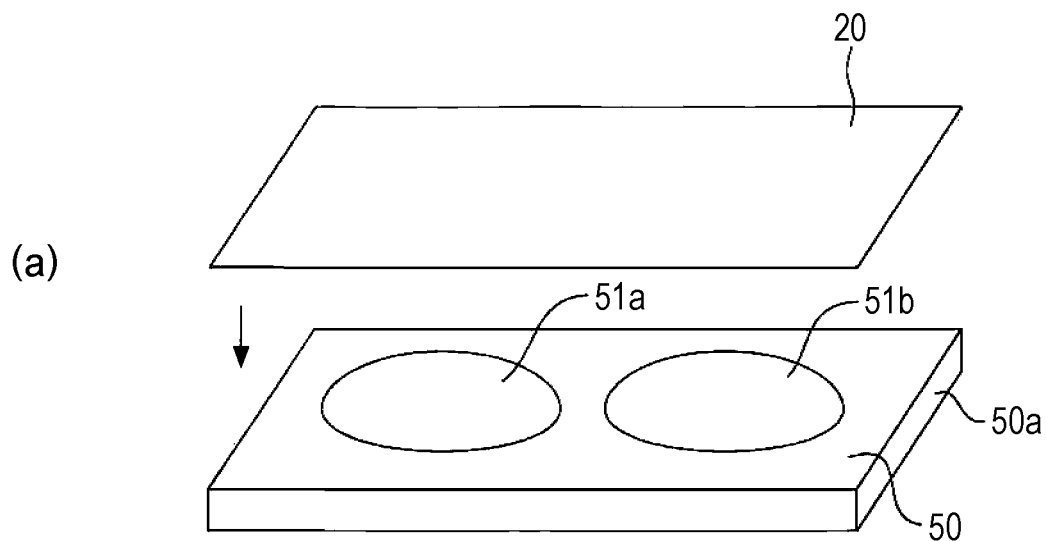
FIG. 6 is a schematic view for explaining another embodiment of a method for molding a polarizing film.
Figure 6:
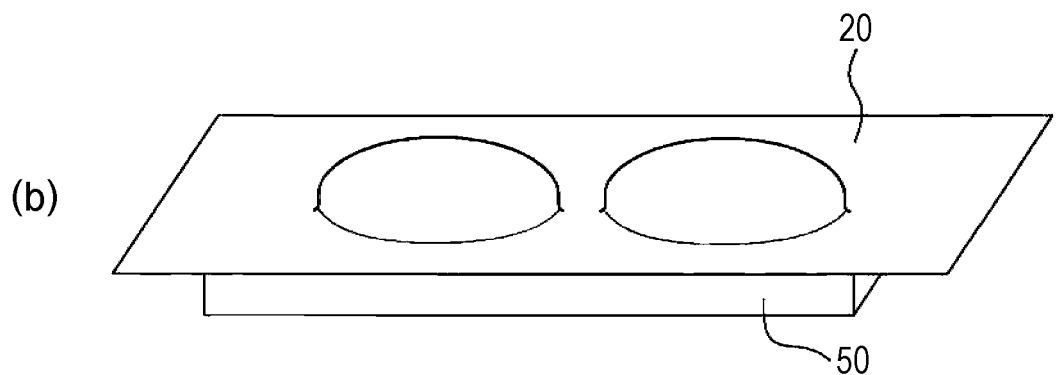
Figure 6:
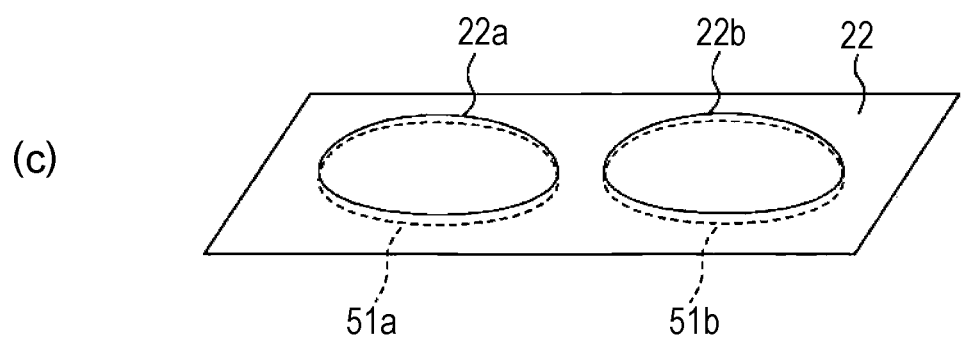

FIG. 6 is a schematic view for explaining another embodiment of a method for molding a polarizing film according to the present invention.

FIG. 6(a) is a diagram illustrating a curved surface processing table of a male mold portion, and the curved surface processing table 50 is configured to include, for example, a ceramic processing base portion 50a and a master mold portion (51a, 51b) which is a spherical glass mold.

A film-shaped polarizing film 20 is placed on the master mold portion of the male mold. The polarizing film 20 is heat-treated according to the present invention.

Next, by pressing with the pressing means having the master mold portion of a female mold (not shown) (refer to FIG. 6(b)), a polarizing film 22 having curved surfaces 22a and 22b to which the shapes of the master mold portions 51a and 51b are transferred is obtained (refer to FIG. 6(c)).

Even in a case where film molding is performed by such a press molding method, by performing the heat treatment on the polarizing film before molding in a temperature range of Tg−20° C. or higher and Tg+10° C. or lower before molding, the film can be molded into a shape such as a predetermined curved surface while maintaining the orientation of the polarizing film before molding, and a decrease in the transmittance of the film after molding can be suppressed.

[Method for producing polarizing lens]

Next, a method for producing a polarizing lens using the polarizing film molded by the method for molding a polarizing film of the present invention will be described with reference to FIGS. 7 to 11 as appropriate.

Hereinafter, a case where the polarizing lens is produced by using a casting method (casting polymerization method) will be described.

Figure 7:
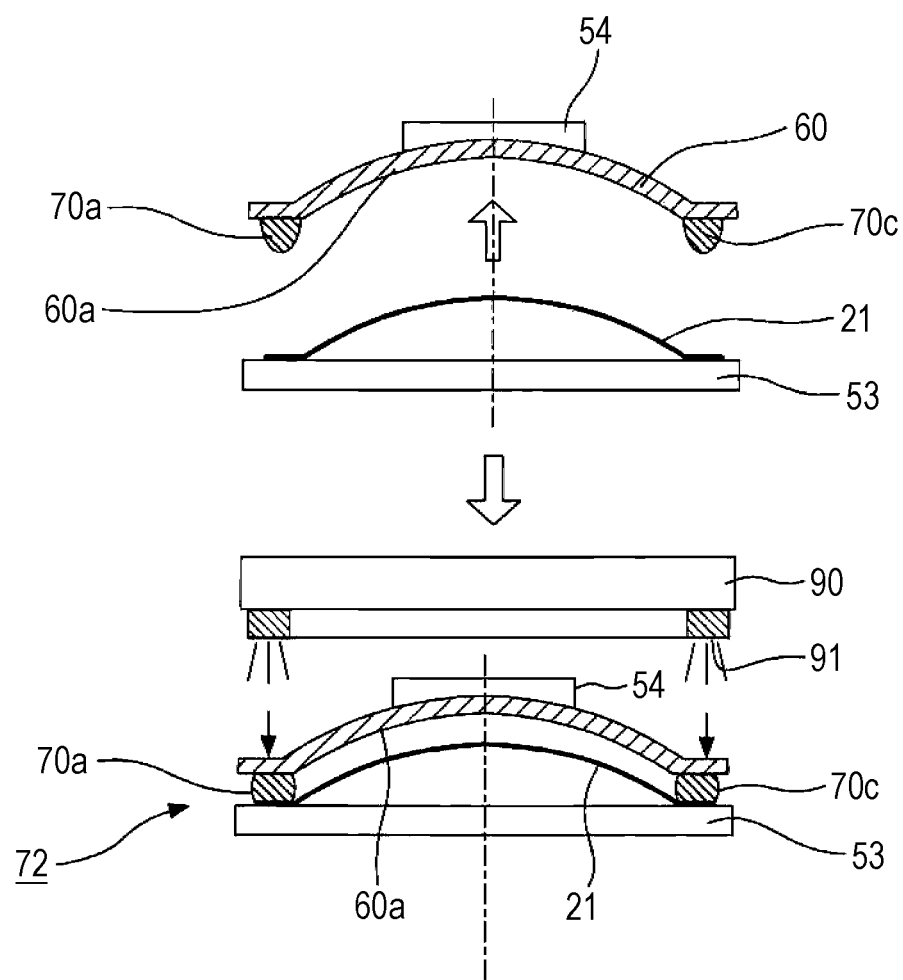
FIG. 7 is a diagram for explaining an assembly of a molding cast used for producing a polarizing lens.
Figure 8:
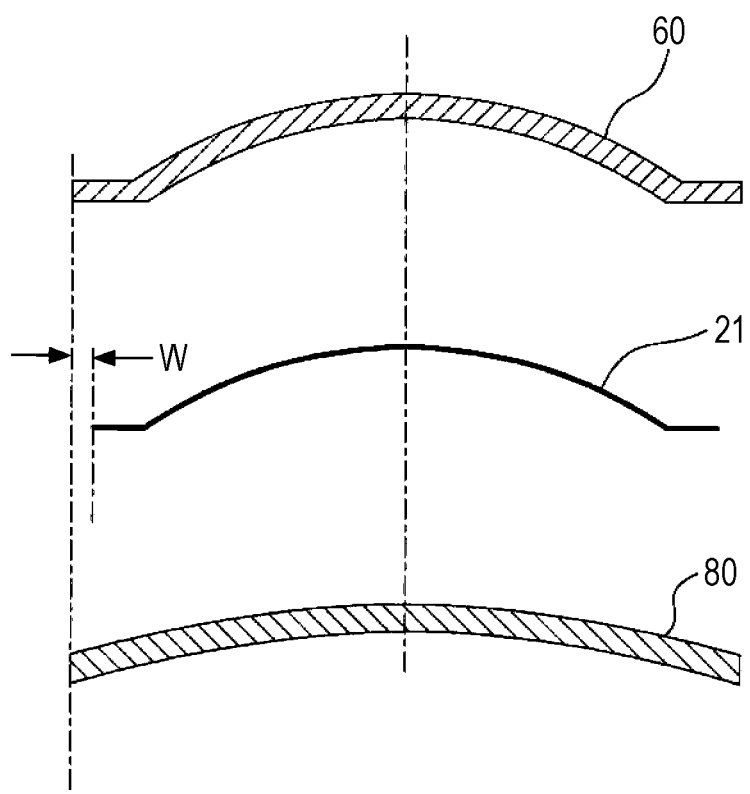
FIG. 8 is a diagram for explaining a relationship between an upper mold, a lower mold, and a polarizing film constituting the molding cast.
Figure 9:
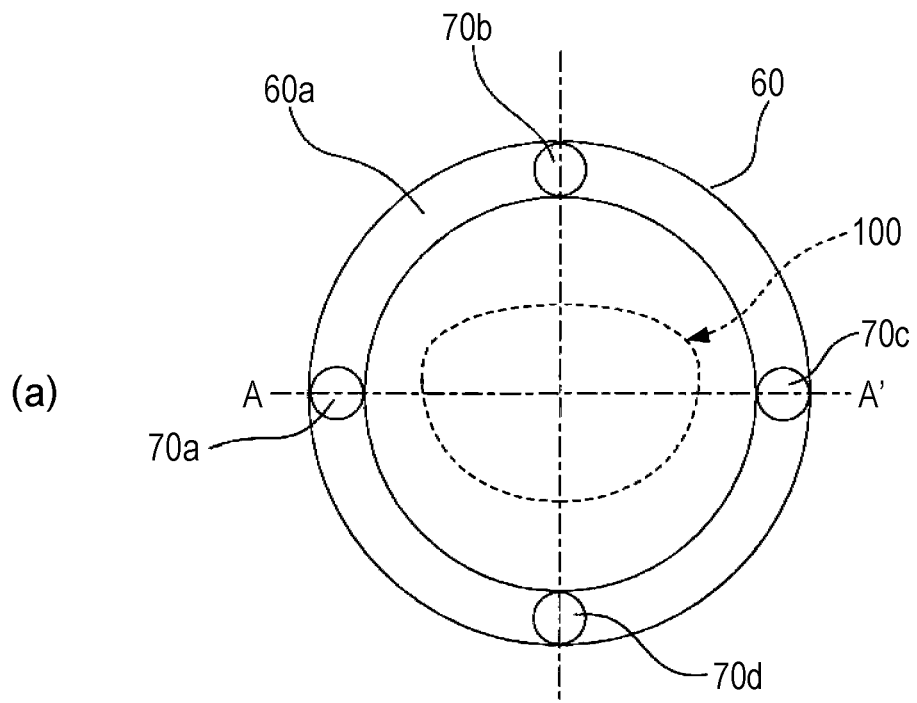
FIG. 9 is a diagram illustrating a state in which a holding member for holding a polarizing film is disposed on the upper mold.
Figure 9:
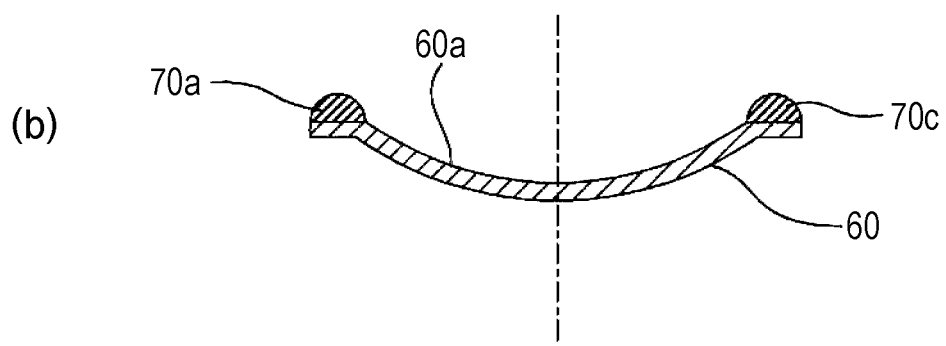
Figure 10:
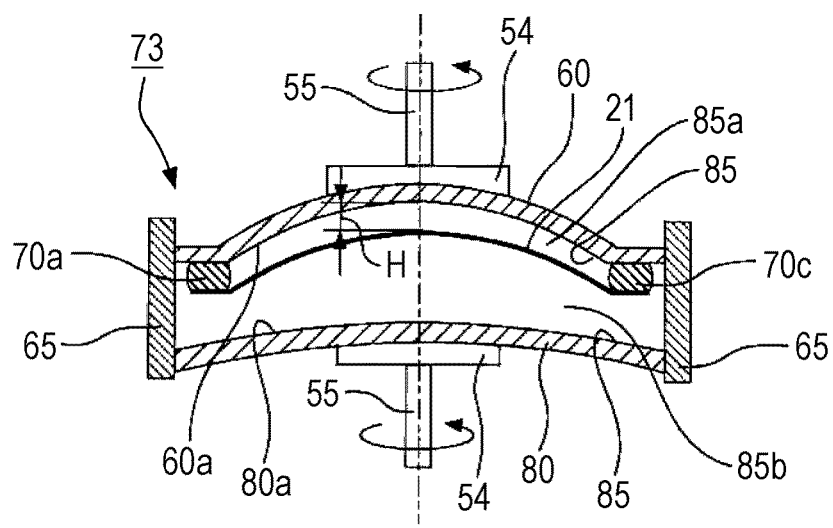
FIG. 10 is a diagram for explaining an assembly of the molding cast used for producing the polarizing lens.
Figure 11:
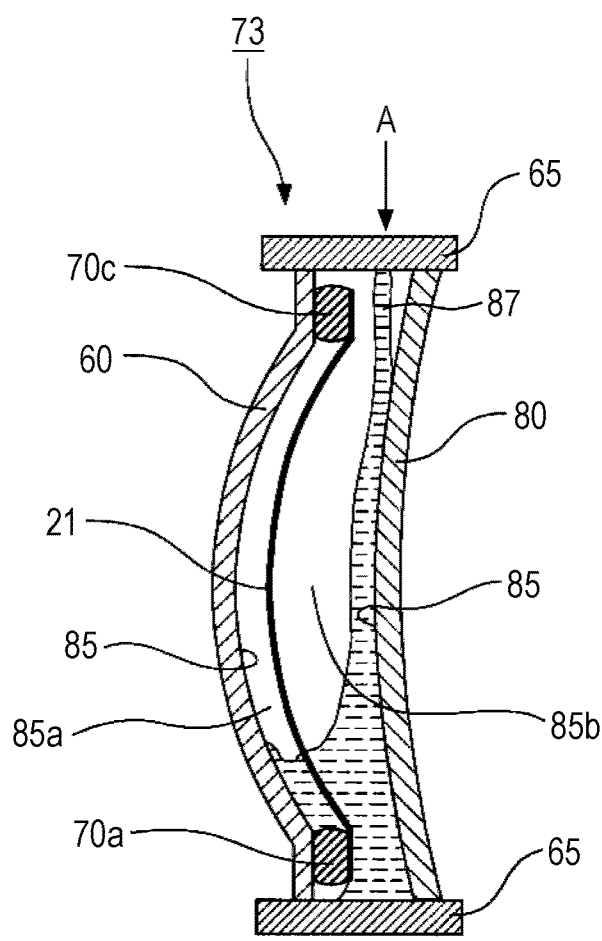
FIG. 11 is a diagram illustrating a state in which a lens monomer is injected into the molding cast.

FIG. 7 is a diagram for explaining an assembly of a molding cast used for producing a polarizing lens. FIG. 8 is a diagram for explaining a relationship between an upper mold, a lower mold, and a polarizing film constituting the molding cast. FIG. 9 is a diagram illustrating a state in which a holding member for holding a polarizing film is disposed on the upper mold. FIG. 10 is a diagram for explaining the assembly of the molding cast used for producing the polarizing lens. FIG. 11 is a diagram illustrating a state in which a lens monomer is injected into the molding cast.

The casting method is a molding method to perform polymerization curing on a lens monomer within a cavity formed by upper and lower molds and a sealing member to adjust a distance between the upper and lower molds, to determine a lens thickness, and to obtain a lens after mold release.

The upper mold 60 and the lower mold 80 constituting the molding cast are also called master molds, and as materials thereof, glass, ceramics, metals, resins, and the like can be used. Generally, chemically strengthened glass is used. The upper mold 60 refers to a mold having a molding surface for forming a surface on the object side of the spectacle lens, and the molding surface is usually a concave surface for forming a convex surface. On the other hand, the lower mold 80 refers to a mold having a molding surface for forming a surface on the eyeball side of the spectacle lens, and the molding surface is usually a convex surface for forming a concave surface.

In the upper mold 60, the inner surface (molding surface) 60a disposed on the cavity side is usually a concave surface, and the surface shape of the concave surface is transferred so that a refracting surface of the convex surface of lens obtained by polymerization curing is formed. On the other hand, in the lower mold 80, the molding surface is usually a convex surface, and the surface shape of the convex surface is transferred so that a refracting surface of the concave surface of lens obtained by polymerization curing is formed.

As the sealing member, a gasket or an adhesive tape can be used. In a case of using the gasket, it is common to clamp and fix the upper and lower molds by a clamping member, made of an elastic body such as a spring. However, the fixing method differs depending on the shape of the gasket, and the present invention is not limited to this. On the other hand, in a case of adhesive tape, a clamp member is usually not required. Hereinafter, as one embodiment, a case of using the adhesive tape as the sealing member will be described.

First, the upper mold 60 and the polarizing film 21 are bonded to each other. The polarizing film 21 is molded into a predetermined curved surface shape by applying the molding method of the present invention described above.

As illustrated in FIG. 7, the upper mold 60 is brought close to the convex surface portion of the polarizing film 21 placed on a fixing base 53 and brought close to a predetermined distance (distance below the height of the holding member) set in advance, and holding members 70a, ..., 70d are placed horizontally on the polarizing film 21 and brought into contact with each other.

As illustrated in FIG. 9, the holding members 70a to 70d for holding the polarizing film 21 are arranged at four positions at 90 degree intervals on a flange portion 60a on the inner surface of the upper mold 60. FIG. 9(b) is a cross-sectional view taken along line A-A' in FIG. 9(a). This holding member is an adhesive, and the adhesive is formed in a columnar shape so as to form a constant height. The holding members 70a to 70d are for adhering and supporting the polarizing films, and when the polarizing films are placed on these holding members, the height and position of the polarizing film are controlled so as to hold the polarizing film while maintaining a predetermined clearance (interval) H (FIG. 10) so that the polarizing film does not come into contact with the inner surface of the upper mold. Further, in the drawing, reference numeral 100 indicates a lens shape of the spectacle frame into which the polarizing lens is framed, and the holding member is cut after frame-insertion processing.

As a method of forming the adhesive as a holding member on the upper mold 60, for example, there is a method of applying an adhesive to an upper mold by using a discharge device capable of discharging a viscous adhesive from a needle at the tip in a predetermined discharge amount by pneumatic control by a dispenser device (not shown).

As the adhesive, it is preferable to use an ultraviolet curable composition containing an ultraviolet curable component and a photopolymerization initiator. As the ultraviolet curable component, it is preferable to select an appropriate one according to the type of lens monomer. An ultraviolet curable epoxy resin or the like is preferable because it has poor reactivity with various monomers used in the producing of plastic lenses.

The height of the adhesive is formed to be substantially the same as the bonding position. In order to hold the polarizing film horizontally, it is preferable that the height of the adhesive at each location is the same. The height of the adhesive is adjusted based on the preset distance between the polarizing film and the upper mold.

After that, the holding member is irradiated with ultraviolet rays 91 from an ultraviolet irradiation device 90 to solidify the holding member. As a result, the polarizing film 21 and the upper mold 60 are adhered to each other, and an upper mold structure 72 in which the polarizing film 21 is held by the upper mold 60 is formed (refer to FIG. 7).

Next, the molding cast is assembled. The molding cast is formed by an upper mold and a lower mold assembled with a polarizing film interposed therebetween and a sealing member (adhesive tape). As illustrated in FIG. 8, the diameter (inner diameter) of the polarizing film 21 is made smaller by W (for example, about 1 mm) than the inner diameters of the upper mold 60 and the lower mold 80, so that in a lens monomer injection step described later, the monomer can wrap around on both sides of the polarizing film, and the monomer can be injected smoothly.

As illustrated in FIG. 10, the lower mold 80 is disposed to face the concave surface side of the polarizing film 21 so that the distance between the upper mold 60 and the lower mold 80 forms a predetermined cavity. When the cavity was formed, material properties such as polymerization shrinkage of a lens monomer were considered. As a result, it is set such that a predetermined lens thickness based on a lens design is satisfied.

Then, while holding the upper mold 60 and the lower mold 80 at a predetermined distance, the adhesive tape 65 is wrapped around the side surfaces of the upper mold 60 and the lower mold 80 over the entire circumference. At this time, the upper mold 60 and the lower mold 80 are set on a fixing pad 54. The fixing pad 54 is rotationally driven by a rotating shaft 55 protruding from a motor device (not shown). It is preferable that the material of the adhesive tape 65 does not react with the lens monomer to cause fogging on the lens or inhibit polymerization. For example, the substrate of the adhesive tape is preferably polypropylene or polyethylene terephthalate, and the adhesive is preferably acrylic, natural rubber, or silicone.

Next, as illustrated in FIG. 11, the prepared lens monomer 87 is injected into the assembled molding cast 73 through an injection hole A. The cavity 85 (85*a*, 85*b*) formed of the upper mold 60, the lower mold 80, and the adhesive tape 65 is filled with the lens monomer 87.

The lens monomer is not particularly limited, and various monomers usually used in the producing of the plastic lenses can be used. For example, those having a benzene ring, a naphthalene ring, an ester bond, a carbonate bond, a urethane bond, or the like in the molecule can be used. Further, a compound containing sulfur and a halogen element can be used, and in particular, a compound having a nuclear halogen-substituted aromatic ring can also be used. A lens monomer can be produced by using one or more of the monomers having the above functional groups. For example, styrene, divinylbenzene, phenyl (meth)acrylate, benzyl (meth)acrylate, naphthyl (meth)acrylate, methyl (meth)acrylate, diethylene glycol bisallyl carbonate, diallyl (iso) phthalate, dibenzylitaconate, dibenzylfumarate, chlorostyrene, nuclear halogen substituted styrene, nuclear halogen substituted phenyl (meth)acrylate, nuclear halogen substituted benzyl (meth)acrylate, (di) (meth)acrylate of a tetrabromobisphenol A derivative, diallyl carbonate of a tetrabromobisphenol A derivative, dioltochlorobenzyl itaconate, dioltochlorobenzyl fumarate, diethylene glycol bis (orthochlorobenzyl) fumarate, (di)ethylene glycol di(meth) acrylate, glycidyl methacrylate, a reaction product of polyfunctional isocyanate such as xylylene diisocyanate and hexamethylene diisocyanate, a reaction product of monohydroxyacrylate of a nuclear halogen-substituted phenol derivative and polyfunctional isocyanate, a reaction product of monohydroxyacrylate of a nuclear halogen-substituted biphenyl derivative and polyfunctional isocyanate, a reaction product of xylene diisocyanate and polyfunctional mercaptan, and a reaction product of glycidyl methacrylate and polyfunctional methacrylate; and mixtures thereof.

After that, the thermosetting lens monomer can be cured by putting the molding cast 73 filled with the lens monomer 87 into a heating furnace and heating it. Here, the heating conditions can be determined by the type of the lens monomer, the temperature is raised to preferably 0° C. to 150° C. and more preferably 10° C. to 130° C. for preferably 5 to 50 hours and more preferably 10 to 25 hours to carry out polymerization curing. For example, it is held at 30° C. for 7 hours, and then the temperature is raised to 30° C. to 120° C. over 10 hours.

When the heat treatment is completed, the lens monomer is solidified and the lens in which the polarizing film is embedded in the molding cast 73 is molded. The molding cast 73 is taken out from the heating furnace, and the lens is released from the upper mold and the lower mold to obtain a polarizing lens as illustrated in FIG. 1.

By using a polarizing film molded into a curved surface or the like by the molding method of the present invention described above, it is possible to obtain a polarizing lens having excellent transmittance and polarizing performance.

The obtained polarizing lens may be further subjected to a surface treatment such as a primer, a hard coat, an antireflection film, and a water repellent treatment for the purpose of impact resistance, abrasion resistance, antireflection, a water repellent treatment, and the like.

The hard coat layer can impart impact resistance to the plastic lens. In addition, since the adhesion of the antireflection layer to the plastic lens is generally not good, the hard coat layer can also play a role of interposing between the plastic lens and the antireflection layer to improve the adhesion of the antireflection layer and prevent peeling.

As a method for forming the hard coat layer, a method of applying a curable composition to the surface of a plastic lens to cure a coating film is commonly used. The curing treatment is performed by heating, light irradiation, or the like, depending on the type of the curable composition. Examples of such a curable composition include a photocurable silicone composition containing a silicone compound that produces a silanol group upon irradiation with ultraviolet rays and an organopolysiloxane having a reactive group such as a halogen atom or an amino group that condenses with the silanol group, an acrylic UV curable monomer composition, and an inorganic fine particles-containing thermosetting composition in which inorganic fine particles such as $SiO_2$ and $TiO_2$ are dispersed in a silane compound having a polymerizable group such as a vinyl group, an allyl group, an acrylic group, or a methacryl group and a hydrolyzable group such as a methoxy group, or a silane coupling agent.

As a method for forming the coating film, a dipping method, a spin coating method, a spray method, a flow method, a doctor blade method, and the like can be adopted. Further, before forming the coating film, the lens surface may be surface-treated by a high voltage discharge such as a corona discharge or a microwave in order to improve the adhesion.

In addition, the antireflection layer is formed of a single layer or a multilayer of an inorganic coating film and an organic coating film. Examples of the material of the inorganic coating film include inorganic substances such as $SiO_2$, $SiO$, $ZrO_2$, $TiO_2$, $TiO$, $Ti_2O_3$, $Ti_2O_5$, $Al_2O_3$, $Ta_2O_5$, $CeO_2$, $MgO$, $Y_2O_3$, $SnO_2$, $MgF_2$, and $WO_3$, and these can be used alone or in combination of two or more. In the case of a plastic lens, $SiO_2$, $ZrO_2$, $TiO_2$, and $Ta_2O_5$, which can be vacuum-deposited at a low temperature, are preferable. Further, in the case of a multilayer film structure, the outermost layer is preferably $SiO_2$.

As a method for forming the inorganic film, for example, vacuum deposition, an ion plating method, a sputtering method, a CVD method, a method of precipitating by a chemical reaction in a saturated solution, or the like can be adopted.

EXAMPLES

Hereinafter, the present invention will be further described in more detail with reference to examples.

Example 1

A commercially available PVA dichroic dye-based polarizing film (Tg: 50° C.) was left to stand in an atmosphere with a relative humidity of 30% for 5 hours before molding, and then the polarizing film was molded by the method described above with reference to FIG. 5. In this example, when molding the shape of this polarizing film, the polarizing film was heat-treated at 40° C. As described above, the temperature inside the chamber was adjusted to 40° C. by the heater 36 installed in the chamber of the molding apparatus 30. In addition, the space inside the upper chamber box 31 and the space inside the lower chamber box 32 of the molding apparatus 30 were first evacuated (−60 kPa) at the same time, and then the space inside the upper chamber box 31 returned to atmospheric pressure (0 kPa).

As described above, a polarizing film molded into a curved surface shape according to Example 1 was obtained.

Figure 12:
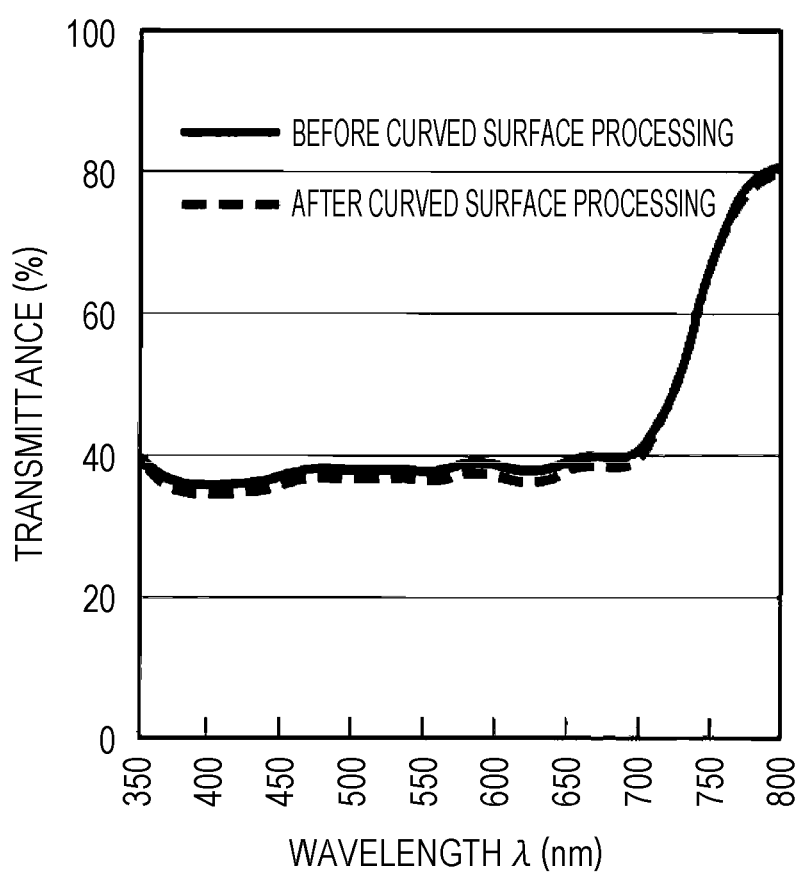
FIG. 12 is a graph of a transmittance curve before and after processing a curved surface in the polarizing film of Example 1.

For the polarizing film molded according to Example 1 obtained as described above, the transmittances before and after curved surface processing were measured using a spectrophotometer (U-4100, available from Hitachi, Ltd. The same applies below.). FIG. 12 is a graph of a transmittance curve before and after processing a curved surface in the polarizing film of Example 1.

As a result, in the polarizing film of Example 1, the decrease in the average transmittance at the wavelength of 400 to 700 nm after the curved surface processing was 1.4% (38.3% before processing→36.9% after processing) with respect to the average transmittance at the wavelength of 400 to 700 nm before the curved surface processing.

That is, it can be seen that when molding the shape of the polarizing film, by performing the heat treatment on the polarizing film before molding in a temperature range of Tg−20° C. or higher and Tg+10° C. or lower, the film can be molded while maintaining the orientation of the polarizing film, and as a result, a decrease in the transmittance of the polarizing film after molding can be suppressed.

On the other hand, if the heat treatment is performed at a temperature higher than Tg+10° C., the orientation of the film deteriorates, and as a result, the decrease rate of the transmittance of the polarizing film after molding is large. Further, when the heat treatment was performed at a temperature lower than Tg−20° C., the decrease in transmittance was not so large, but it was lower than the softening temperature of the film, so that it was difficult to mold it into a desired shape.

(Producing of polarizing lens) Using the polarizing film molded into the curved surface shape according to the above Example 1, a polarizing lens in which the polarizing film was embedded was produced by the method described with reference to FIGS. 7 to 11 described above.

By molding the polarizing film into a shape such as a curved surface by the molding method of the present invention, it is possible to suppress a decrease in the transmittance of the polarizing film after molding, and thereby it is possible to obtain a polarizing lens having excellent transmittance and polarizing performance by using such a polarizing film.

Example 2

A polarizing film molded into a curved surface shape according to Example 2 was obtained in the same manner as in Example 1 except that a commercially available PVA dichroic dye-based polarizing film (Tg: 50° C.) in Example 1 was left to stand in an atmosphere with a relative humidity of 70% for 5 hours before molding, and then the polarizing film was heat-treated at 60° C. when molding the shape of the polarizing film.

As a result of measuring the transmittances of the obtained polarizing film molded according to Example 2 before and after curved surface processing using a spectrophotometer, in the polarizing film of Example 2, it was possible to suppress the decrease in the average transmittance at a wavelength of 400 to 700 nm after the curved surface processing within 5% with respect to the average transmittance at a wavelength of 400 to 700 nm before the curved surface processing.

Example 3

A polarizing film molded into a curved surface shape according to Example 3 was obtained in the same manner as in Example 1 except that a commercially available PVA dichroic dye-based polarizing film (Tg: 50° C.) in Example 1 was left to stand in an atmosphere with a relative humidity of 50% for 5 hours before molding, and then the polarizing film was heat-treated at 30° C. when molding the shape of the polarizing film.

As a result of measuring the transmittances of the obtained polarizing film molded according to Example 3 before and after curved surface processing using a spectrophotometer, in the polarizing film of Example 3, it was possible to suppress the decrease in the average transmittance at a wavelength of 400 to 700 nm after the curved surface processing within 5% with respect to the average transmittance at a wavelength of 400 to 700 nm before the curved surface processing.

Example 4

A commercially available PVA dichroic dye-based polarizing film (Tg: 50° C.) was left to stand in an atmosphere with a relative humidity of 20% for 5 hours before molding, and then the polarizing film was molded by the method described above with reference to FIG. 5. In this example, when molding the shape of this polarizing film, the polarizing film was heat-treated at 50° C. As described above, the temperature inside the chamber was adjusted to 50° C. by the heater 36 installed in the chamber of the molding apparatus 30. In addition, the space inside the upper chamber box 31 and the space inside the lower chamber box 32 of the molding apparatus 30 were first evacuated (~60 kPa) at the same time, and then the space inside the upper chamber box 31 returned to atmospheric pressure (0 kPa).

As described above, a polarizing film molded into a curved surface shape according to Example 4 was obtained.

(Reference Example)

A polarizing film molded into a curved surface shape was obtained in such a manner that the same commercially available PVA dichroic dye-based polarizing film (Tg: 50° C.) as in Example 1 was moistened (humidified and heated) under high temperature and high humidity (70° C. or higher, 99% RH) using the press molding method in the related art (refer to FIG. 6 described above).

For the polarizing film molded according to Example 4 and Reference Example obtained as described above, the transmittances before and after curved surface processing were measured using a spectrophotometer. In addition, the number of foreign matter adhesions to the film surface (measurement range: film diameter within 90 mmφ) after molding was measured. For the foreign matter, the number of foreign matters of a size that can be visually confirmed was counted.

In the polarizing film of Example 4, the decrease in the average transmittance at the wavelength of 400 to 700 nm after the curved surface processing was 1.5% with respect to the average transmittance at the wavelength of 400 to 700 nm before the curved surface processing. When molding the shape of the polarizing film, by performing the heat treatment on the polarizing film before molding in a temperature range of Tg−20° C. or higher and Tg+10° C. or lower, it was possible to mold the film while maintaining the orientation of the polarizing film, and thus the decrease in transmittance of the polarizing film after molding was able to be suppressed within 5%.

Further, when the polarizing film is molded by the method for molding the polarizing film, the surface of the polarizing film that was not in contact with the molding surface was molded in a non-contact state with any of the members, it was possible to eliminate foreign matter adhesion during molding at least on the non-contact surface of the film.

On the other hand, in the polarizing film obtained by Reference Example by the press molding method in the related art, the number of foreign matter adhesions to the film surface after molding was as large as 6 to 7. In addition, when the heat treatment was performed at a temperature higher than Tg+20° C. (the above Reference Example), the orientation of the film deteriorated, and as a result, the rate of decrease in the transmittance of the polarizing film after molding was large, and it was not possible to suppress the decrease in transmittance within 5%.

(Producing of polarizing lens)

Using the polarizing film molded into the curved surface shape according to the above Example 4, a polarizing lens in which the polarizing film was embedded was produced by the method described with reference to FIGS. 7 to 11 described above.

By molding the polarizing film into a shape such as a curved surface by the molding method of the present invention, it is possible to suppress a decrease in the transmittance of the polarizing film after molding, and thereby it is possible to obtain a polarizing lens having excellent transmittance and polarizing performance by using such a polarizing film.

Example 5

A commercially available PVA dichroic dye-based polarizing film (Tg: 50° C.) was held in an atmosphere with a relative humidity of 30% for 10 hours before molding, and then the polarizing film was molded by the method described above with reference to FIG. 5. In this example, when molding the shape of this polarizing film, the polarizing film was heat-treated at 45° C. As described above, the temperature inside the chamber was adjusted to 45° C. by the heater 36 installed in the chamber of the molding apparatus 30. In addition, the space inside the upper chamber box 31 and the space inside the lower chamber box 32 of the molding apparatus 30 were first evacuated (~60 kPa) at the same time, and then the space inside the upper chamber box 31 returned to atmospheric pressure (0 kPa).

As described above, a polarizing film molded into a curved surface shape according to Example 5 was obtained.

As a result of measuring the average transmittance at a wavelength of 400 to 700 nm of the polarizing film molded according to Example 5 obtained as described above before and after curved surface processing using a spectrophotometer, in the polarizing film of Example 5, the decrease in the average transmittance at a wavelength of 400 to 700 nm after the curved surface processing was 1.4% with respect to the average transmittance at a wavelength of 400 to 700 nm before the curved surface processing. In addition, the decrease rate was suppressed within 10%.

(Producing of polarizing lens)

Using the polarizing film molded into the curved surface shape according to the above Example 5, a polarizing lens in which the polarizing film was embedded was produced by the method described with reference to FIGS. 7 to 11 described above.

Since the polarizing film according to the present invention has a small decrease in the transmittance of the polarizing film after molding, it was possible to obtain a polarizing lens having excellent transmittance and polarizing performance by using this polarizing film.

REFERENCE SIGNS LIST

10 Polarizing lens
11 First lens substrate
12 Second lens substrate
20 Polarizing film (before molding)
21 Polarizing film (after molding)
30 Molding apparatus
31 Upper chamber box
32 Lower chamber box
35 Molding die
36 Heater
37, 38 Driving device
60 Upper mold
73 Molding cast
80 Lower mold
85 Cavity
87 Lens monomer

The invention claimed is:

1. A method for molding a polarizing film, the method comprising:
   molding the polarizing film into a curved shape, wherein
   when the polarizing film is molded, the polarizing film is heat-treated in a temperature range of Tg−20° C. or higher and Tg+10° C. or lower, where Tg is a glass transition point of a resin constituting the polarizing film,
   one chamber is divided into a first space and a second space,
   a molding die is disposed in the second space,
   the polarizing film is disposed in the chamber,
   the polarizing film is transfer-molded along a convex molding surface of the molding die by a differential pressure generated by making a pressure in the first space and a pressure in the second space different from each other, and
   the convex molding surface of the molding die is configured to be in contact with only a portion of the polarizing film that is configured to be formed into a polarizing lens, wherein
   a surface of the polarizing film facing the first space remains in a non-contact state during the transfer-molding.

2. The method for molding a polarizing film according to claim 1, wherein when the shape of the polarizing film is molded, the polarizing film is left in an atmosphere having a relative humidity of 20% or more and 70% or less.

3. The method for molding a polarizing film according to claim 2, wherein the polarizing film before molding is left in the atmosphere having a relative humidity of 20% or more and 70% or less, and then heat-treated.

4. The method for molding a polarizing film according to claim 1, wherein a difference of average transmittance of the polarizing film at a wavelength of 400 to 700 nm is 5% or less before and after molding the shape of the polarizing film.

5. The method for molding a polarizing film according to claim 1, wherein the polarizing film is used for producing the polarizing lens having the polarizing film embedded inside the polarizing lens.

6. A method for producing a polarizing lens, the method comprising:
- a step of molding the polarizing film by the method for molding the polarizing film according to claim 1; and
- a step of molding a polarizing lens by sandwiching the molded polarizing film inside the polarizing lens.

* * * * *